United States Patent [19]
Yukimoto et al.

[11] Patent Number: 5,290,847
[45] Date of Patent: Mar. 1, 1994

[54] CURABLE COMPOSITION

[75] Inventors: Sadao Yukimoto; Fumio Kawakubo, both of Kobe, Japan

[73] Assignee: Kanegafuchi Kagaku Kogyo Kabushiki Kaisha, Osaka, Japan

[21] Appl. No.: 774,134

[22] Filed: Oct. 15, 1991

Related U.S. Application Data

[63] Continuation of Ser. No. 382,044, Jul. 18, 1989, abandoned, which is a continuation of Ser. No. 106,300, Oct. 9, 1987, abandoned.

[30] Foreign Application Priority Data

Oct. 9, 1986 [JP] Japan ................................ 61-240975

[51] Int. Cl.$^5$ ............................................. C08L 71/02
[52] U.S. Cl. ..................................... 524/506; 524/521; 525/104
[58] Field of Search .................... 525/104, 106, 100; 524/506, 521

[56] References Cited

U.S. PATENT DOCUMENTS

| | | | |
|---|---|---|---|
| 3,971,751 | 7/1976 | Isayama et al. | 524/788 |
| 4,310,640 | 1/1982 | Kato et al. | 525/100 |
| 4,323,488 | 4/1982 | Takago et al. | 528/32 |
| 4,371,664 | 2/1983 | Kato et al. | 525/100 |
| 4,503,189 | 3/1985 | Igarashi et al. | 525/104 |
| 4,506,052 | 3/1985 | Furukawa et al. | 525/100 |
| 4,623,693 | 11/1986 | Inoue et al. | 524/700 |
| 4,665,127 | 5/1987 | Hirose et al. | 525/100 |
| 4,707,517 | 11/1987 | Bullen et al. | 525/104 |

FOREIGN PATENT DOCUMENTS

| | | |
|---|---|---|
| 0012559 | 6/1980 | European Pat. Off. |
| 0035049 | 9/1981 | European Pat. Off. |
| 0043965 | 1/1982 | European Pat. Off. |
| 0108946 | 5/1984 | European Pat. Off. |
| 2551275 | 5/1976 | Fed. Rep. of Germany |

OTHER PUBLICATIONS

Titow, W. V. et al, *Reinforced Thermoplastics*, John Wiley & Sons, New York, N.Y., 1975, p. 116.
Kraus, G., *Reinforcement of Elastomers*, Interscience Publishers, New York, 1965, pp. 323–328.

*Primary Examiner*—Ralph H. Dean
*Attorney, Agent, or Firm*—Armstrong, Westerman, Hattori, McLeland & Naughton

[57] ABSTRACT

A curable composition including (A) 100 parts by weight of an organic polymer having at least one cross-linkable group containing a silicon atom to which a hydrolyzable group is bonded, and (B) 10 to 500 parts by weight of a vinyl chloride polymer. In the curable composition of the present invention, the viscosity is not lowered even after the storage for a long time and therefore the workability as sealants is not lowered.

5 Claims, No Drawings

CURABLE COMPOSITION

This application is a continuation of application Ser. No. 07/382,044, filed Jul. 18, 1989, now abandoned, which is a continuation of Ser. No. 07/106,300, filed Oct. 9, 1987, now abandoned.

BACKGROUND OF THE INVENTION

The present invention relates to a curable composition, and more particularly to a curable composition having improved storage stability.

A widely known composition, which upon exposure to atmospheric moisture is curable to form a rubbery substance, comprises an organic polymer having a cross-linkable group containing a silicon atom to which a hydrolyzable group is bonded (hereafter referred to as "hydrolyzable silicon group") as shown, for instance, in U.S. Pat. No. 3,971,751. The curable composition is suitable for use in sealants and other similar materials.

It is known that the curable composition may be used in the form of a two-package system in which a main component and a curing agent are separately prepared and maintained, and are then admixed shortly before use. Also known is a one-package system in which a main component and a curing agent are previously admixed and the mixture is stored in an airtight container in an anhydrous state. Upon application, the mixture is cured by moisture in the air. The one-package system is considered to possess superior workability to that of the two-package system. However, in some instances, the one-package cures even when it is in an airtight container, with a consequent decrease in the workability of the composition. Thus, there is a need in the art for a curing composition possessing excellent storage stability.

Poor storage stability of the known curable composition results from moisture in an inorganic filler containing a large amount of water, such as calcium carbonate, talc or silicon dioxide. The fillers are admixed with the curable composition to impart rubber-like properties to the cured product of the composition or to lower the cost of the composition. During storage, the viscosity of the composition increases, or the composition solidifies as a result of cross-linking of the hydrolyzable silicon groups in the organic polymer through hydrolysis and a silanol condensation reaction.

Although several methods are known which improve storage stability of the composition in the one-package system, each suffers from certain disadvantages. Methanol may be added to the curable composition and an azeotropic dehydration performed to remove the moisture, but the operation is complicated. Alternatively, silanes or siloxanes having a hydrolyzable silicon group may be added to the curable composition, but the modulus of elasticity of the cured product is too great. Additionally, an alkyl ester of orthoformic acid (such as methyl orthoformate) may be added to the curable composition, but the curable composition still suffers from insufficient storage stability. Further, storage stability may be improved by drying the inorganic fillers in vacuo, but a special vacuum dryer is required and consequently high equipment costs are incurred.

An object of the present invention is to provide a one-package curable composition possessing excellent storage stability by adding a filler other than an inorganic filler to the composition.

This and other objects of the present invention will become apparent from the following description.

SUMMARY OF THE INVENTION

In accordance with the present invention, there is provided a curable composition comprising, (A) 100 parts by weight of an organic polymer having in its molecule at least one cross-linkable group containing a silicon atom to which a hydrolyzable group is bonded, the cross-linkable group being cross-linkable to produce an elastomer by the formation of a siloxane bond; and (B) 10 to 500 parts by weight of a vinyl chloride polymer.

The curable composition of the present invention contains almost no moisture and consequently its viscosity does not increase, nor does its workability decrease, during storage.

DETAILED DESCRIPTION

The organic polymer having at least one hydrolyzable silicon group in its molecule of the present invention (hereinafter referred to as "organic polymer (A)") is an organic polymer having at least one, and preferably 1.1 to 5.0 hydrolyzable silicon groups per molecule of the organic polymer (A) either at the terminals of the polymer chain or as a pendant group, but preferably at the terminals of the polymer chain.

The term "hydrolyzable silicon group" as used herein means a cross-linkable group containing a silicon atom to which a hydrolyzable group is bonded which can cross-link to produce an elastomer by the formation of a siloxane bond (Si—O—Si). The siloxane bond is formed through hydrolysis of the hydrolyzable group and a silanol condensation reaction.

A representative example of the hydrolyzable silicon group is a group represented by the formula (1):

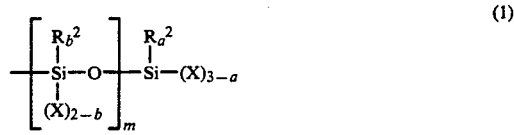

wherein $R^2$ is a hydrocarbon group having 1 to 20 carbon atoms or a triorganosiloxy group represented by the formula (2):

in which each $R^3$ is a monovalent hydrocarbon group having 1 to 20 carbon atoms, and when more than one $R^2$ group is present, the $R^2$ groups are the same or different; X is a hydrolyzable group, and when more than one X group is present, the X groups are the same or different; a is 0, 1, 2 or 3, and b is 0, 1 or 2, provided that at least one X is present in the hydrolyzable silicon group; and m is 0 or an integer from 1 to 18.

As mentioned above, the $R^2$ groups are the same or different, and each is a monovalent hydrocarbon group having 1 to 20 carbon atoms or the triorganosiloxy group. Examples of the hydrocarbon group include, for instance, an alkyl group (such as a methyl group or an ethyl group), a cycloalkyl group (such as a cyclohexyl group), an aryl group (such as a phenyl group), and an aralkyl group (such as a benzyl group). The triorganosiloxy group has the formula (2):

$$(R^3)_3SiO— \quad (2)$$

wherein each $R^3$ is a monovalent hydrocarbon group having 1 to 20 carbon atoms, such as a methyl group or a phenyl group. It is preferable that the $R^2$ or $R^3$ group is a methyl or a phenyl group from the standpoint of availability of starting materials.

Referring to formula (1), examples of the hydrolyzable X group are, for instance, a halogen atom, a hydrogen atom, an alkoxyl group, an acyloxyl group, a ketoxymate group, an amino group, an amido group, an aminoxy group, a mercapto group, an alkenyloxy group, and the like. Among them, the alkoxyl group is preferable because it is easily handled.

The number of the hydrolyzable silicon groups in the organic polymer (A) is at least one, and preferably from 1.1 to 5.0, per molecule of the organic polymer (A). When the number of the hydrolyzable silicon groups is less than 1.0, the polymer is insufficiently cured. The number of the hydrolyzable silicon groups does not have an upper limit, but it is preferable that the number is not more than 5 from the standpoint of the tensile properties of the cured product.

It is preferable that the organic polymer (A) has an average molecular weight within the range of 300 to 1,000,000.

Examples of the organic polymer (A) of the present invention include: a polymer whose main chain is substantially composed of an alkylene oxide polymer, an ether-ester block copolymer, a vinyl polymer or copolymer, a diene polymer, and the like.

If the organic polymer (A) of the present invention is an alkylene oxide polymer, it is preferable that the main chain is composed essentially of repeating units of the formula (3):

$$—R^1—O— \quad (3)$$

wherein $R^1$ is a bivalent hydrocarbon group having 1 to 8 carbon atoms. It is most preferable that the main chain is composed essentially of repeating units represented by the formula (3) wherein $R^1$ is a hydrocarbon group having 1 to 4 carbon atoms.

The term "essentially" as used above means that the main chain may include monomer units and/or polymer units other than —$R^1$—O—. When an alkylene oxide polymer is the organic polymer (A), it constitutes more than 50% by weight, preferably more than 70% by weight, and more preferably more than 90% by weight, of the above-mentioned repeating units. Examples of the bivalent hydrocarbon group $R^1$ are, for instance,

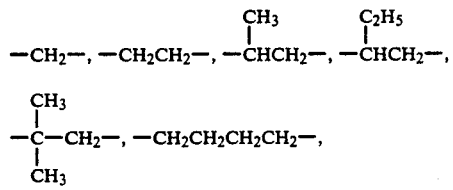

The main chain of the alkylene oxide polymer comprises repeating units of one kind, or two or more kinds. Particularly, it is preferably that $R^1$ is

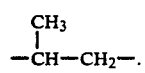

It is preferable that the number average molecular weight of the alkylene oxide polymer is from 300 to 30,000, and more preferably from 3,000 to 15,000. Especially, an alkylene oxide polymer having hydrolyzable silicon groups at the terminals and having a number average molecular weight of 3,000 to 15,000 is preferred from the standpoint of easy handling and the tensile properties of the finished product.

As mentioned above, the organic polymer (A) of the present invention may be substantially composed of a vinyl polymer, a vinyl copolymer, or a diene polymer.

Examples of such polymers are, for instance, polybutadiene, styrene-butadiene copolymer, acrylonitrile-butadiene copolymer, acrylic acid ester-butadiene copolymer, ethylene-butadiene copolymer, vinylpyridine-butadiene copolymer, ethylene-propylene copolymer, ethylene-vinylacetate copolymer, ethylene-acrylic acid ester copolymer, polyisoprene, styrene-isobutylene copolymer, isobutylene-isoprene copolymer, polychloroprene, styrene-chloroprene copolymer, acrylonitrile-chloroprene copolymer, polyisobutylene, polyacrylic acid ester, polymethacrylic acid ester and the like.

Among these polymers, an organic polymer having not less than 50% by weight of acrylic or methacrylic acid esters is preferred. Examples of the acrylic or methacrylic acid ester are acrylic or methacrylic acid esters of a linear, branched or alicyclic alcohol having 2 to 12 carbon atoms, such as n-butyl acrylate or methacrylate, 2-ethylhexyl acrylate or methacrylate, ethyl acrylate, propyl acrylate, isobutyl acrylate or methacrylate, amyl acrylate or methacrylate, hexyl acrylate or methacrylate, cyclohexyl acrylate or methacrylate, n-octyl acrylate or methacrylate and n-decyl acrylate or methacrylate.

A vinyl polymer or copolymer having hydrolyzable silicon groups with an average molecular weight of 500 to 1,000,000, especially a molecular weight of 2,000 to 500,000 is preferred as the organic polymer (A). In the case of using the vinyl polymer or copolymer having hydrolyzable silicon groups at the terminals, it is preferable that the vinyl polymer or copolymer has a molecular weight of 3,000 to 15,000.

The organic polymer (A) may be used alone or as an admixture thereof. For instance, it is possible to use the alkylene oxide polymer with the vinyl polymer such as an acrylic alkyl ester polymer having the hydrolyzable silicon groups. Also, a polymer having the hydrolyzable silicon groups obtained by the polymerization of a vinyl monomer such as an alkyl ester of acrylic acid in the presence of the alkylene oxide polymer can be used.

The alkylene oxide polymer and the ether-ester block copolymer can be prepared by methods disclosed in, for instance, U.S. Pat. No. 3,971,751, Japanese Examined Patent Publication No. 36319/1970, No. 12154/1971 and No. 32673/1974 and Japanese Unexamined Patent Publication No. 156599/1975, No. 73561/1976, No. 6096/1979, No. 13768/1980, No. 82134/1980, No. 131022/1980, No. 135135/1980 and No. 137129/1980.

The vinyl polymer and the vinyl copolymer can be prepared by methods disclosed in, for instance, Japanese Examined Patent Publication No. 28301/1976, and Japanese Unexamined Patent Publication No. 179210/1982.

The diene polymer can be prepared by methods disclosed in, for instance, Japanese Examined Patent Publication No. 17553/1970 and Japanese Unexamined Patent Publication No. 1389/1972.

According to the present invention, vinyl chloride polymer (B) is combined with organic polymer (A). The composition of the present invention has excellent storage stability due to the vinyl chloride polymer (B). Furthermore, by using vinyl chloride polymer (B), the curing time (i.e., the time necessary to obtain a tack free surface when curing) of the composition becomes shorter. Typical examples of the vinyl chloride polymer (B) are, for instance, a vinyl chloride homopolymer, a copolymer of vinyl chloride and another component such as vinyl acetate, vinylidene chloride, an ester of acrylic acid or methacrylic acid, maleic acid or its ester, acrylonitrile, and the like. When a vinyl chloride copolymer is used, it can have not less than 50% by weight vinyl chloride units.

The vinyl chloride polymer (B) can be used alone or as an admixture thereof. Also, the vinyl chloride polymer (B) having an average degree of polymerization of 200 to 10,000, preferably 300 to 4,000, can be used.

According to the invention, the vinyl chloride polymer (B) can be a porous vinyl chloride homopolymer or copolymer having a particle size of 50 to 200 $\mu$m. These compounds can be prepared by a suspension polymerization. The vinyl chloride polymer (B) can be also a homopolymer or a copolymer having a particle size of 0.01 to 10 $\mu$m, preferably from 0.02 to 5 $\mu$m which is usually called vinyl chloride paste resin. It is prepared by an emulsion polymerization. Particularly when using the vinyl chloride paste resin, the curable composition of the present invention can yield a cured product having an excellent tensile property (elongation).

Also, when a plasticizer for vinyl chloride polymers is used with the vinyl chloride polymer (B), the cured product has an excellent tensile property in comparison with the case in which no plasticizer is used or with the case in which inorganic fillers is used instead of vinyl chloride polymer (B). Examples of the plasticizer are, for instance, phthalic acid esters such as dibutyl phthalate, diheptyl phthalate, di(2-ethylhexyl)phthalate, butyl benzyl phthalate and butyl phthalyl butyl glycolate; non-aromatic dibasic acid esters such as dioctyl adipate and dioctyl sebacate; polyalkylene glycol esters such as diethylene glycol dibenzoate and triethylene glycol dibenzoate; phosphoric acid esters such as tricresyl phosphate and tributyl phosphate; chlorinated paraffins; epoxidated soy bean oil; and the like.

When a plasticizer is used with the vinyl chloride polymer (B), an increase of viscosity or a solidification of the composition is often observed during storage. This fact can be attributed to the gelation of vinyl chloride polymer or absorption of the plasticizer by the vinyl chloride polymer. To prevent the increase in the viscosity or the solidification of the composition, it is desirable to partially gelatinize the vinyl chloride polymer by heating it with the plasticizer before or during preparation of the composition of the present invention. It is preferable to use vinyl chloride paste resin for partial gelation since vinyl chloride paste resin can be gelatinized at low temperature such as 50° to 120° C., and the composition of the present invention can be easily prepared from gelatinized vinyl chloride paste resin.

The vinyl chloride polymer (B) is used in an amount of 10 to 500 parts by weight, preferably from 50 to 300 parts by weight, based on 100 parts by weight of the organic polymer (A). When the amount of the vinyl chloride polymer (B) is less than 10 parts by weight, the effect that it imparts as a filler is insufficient. On the other hand, when the amount is more than 500 parts by weight, the tensile properties of the cured product become lower.

When a plasticizer for the vinyl chloride polymer (B) is used in the composition of the present invention, it is preferable that the amount of the plasticizer for the vinyl chloride polymer (B) is present in an amount from 10 to 500 parts by weight based on 100 parts by weight of the organic polymer (A) and is present in an amount from 10 to 200 parts by weight based on 100 parts by weight of the vinyl chloride polymer (B).

The curable composition of the present invention may contain various fillers, plasticizers solvents, curing catalysts, and the like.

Examples of the fillers other than the vinyl chloride polymer (B) are, for instance, calcium carbonate, Kaoline (clay), talc, magnesium carbonate, aluminum silicate, titanium oxide, zinc oxide, iron oxide, asbestos, glass powder, carbon black, and the like.

As the plasticizer, the above-mentioned plasticizer for vinyl chloride polymer (B) and conventional plasticizers are used. For example, dioctyl phthalate, butylbenzyl phthalate, an epoxidized soybean oil, a chlorinated paraffin, an alkyl diphenyl, partially hydrogenated terphenyl, and the like can be used.

Examples of the solvent are, for instance, an aromatic hydrocarbon solvent such as xylene or toluene, a lower alcohol such as methanol or ethanol, and the like.

Examples of the additive are, for instance, an adhesion accelerator, an antisagging agent, an antioxidant, coloring agent, and the like.

Examples of the adhesion accelerator are, for instance, epoxy resins, phenol resis, various silane coupling agents having a functional group such as $\gamma$-propyltrimethoxysilane, $\gamma$-mercaptopropyltrimethoxysilane, $\gamma$-mercaptopropylmethyldimethoxysilane, $\gamma$-glycidoxypropyltrimethoxysilane or N-($\beta$-aminoethyl)aminopropylmethyldimethoxysilane, alkyl titanates, aromatic polyisocyanates, and the like.

Examples of the antisagging agent are, for instance, a hydrogenated castor oil, an organic bentonite, a metallic soap, and the like.

Examples of the curing catalyst are, for instance, a titanate such as tetrabutyl titanate or tetrapropyl titanate; an organotin compound such as dibutyl tin dilaurate, dibutyl tin maleate, dibutyl tin diacetate, tin octylate or tin naphthenate; lead octylate; an amine compound such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylendiamine, triethylenediamine, guanidine, diphenylguanidine, 2,4,6-tris(dimethylaminomethyl)phenol, morpholine, N-methylmorpholine or 1,3-diazabicyclo-(5,4,6)undecene-7 (DBU), and its salt with a carboxylic acid or the like. The curing catalysts may be employed alone or as an admixture thereof.

The curable composition of the present invention is suitable for use not only in a sealant but also in an adhesive, a molding material, a vibration proofing material, a foaming material, and the like.

The present invention is more specifically described and explained by means of the following Examples and Comparative Examples. It is to be understood that the present invention is not limited to the Examples, and various changes and modifications may be made in the invention without departing from the spirit and scope thereof.

EXAMPLES 1 TO 3

To a mixture of a propylene oxide polymer (A) having a number average molecular weight of 8,000 and having a group:

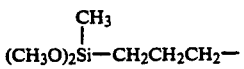

at 80% of the whole polymer terminals and vinyl chloride paste resin (B) having a average degree of polymerization of 1,300 and a particle size of about 1 μm (commercially available under the trade name "PSM-30", made by Kanegafuchi Kagaku Kogyo Kabushiki Kaisha) were added calcium carbonate having a particle size of about 0.08 μm (commercially available under the trade name "CCR", made by Shiraishi Kogyo Kabushiki Kaisha), dioctyl phthalate as a plasticizer, titanium dioxide as a pigment, a hindered phenol antioxidant (commercially available under the trademark "Nocrac NS-6" made by Ouchi Shinko Kagaku Kabushiki Kaisha), and a hydrogenated caster oil as an antisagging agent in the predetermined amounts shown in Table 1.The mixture was kneaded for 3 hours at 120° C. with dehydrating under a reduced pressure of 10 mm Hg. After cooling to room temperature, xylene was added thereto in the amount shown in Table 1 to lower the viscosity of the mixture. To the resulting mixture N-(β-aminoethyl)-γ-aminopropyltrimethoxysilane, as an adhesion accelerator (commercially available under the trade name "A1120" made by Nippon Unicar Kabushiki Kaisha), and an organic tin compound, as a curing catalyst (commercially available under the trade name "No 918" made by Sankyo Yuki Gosei Kabushiki Kaisha) were added in the amounts shown in Table 1 and the mixture was kneaded to give a pasty composition.

The obtained pasty composition was charged into a sealed container and the container was allowed to stand at 50° C. for one month. The viscosity of the composition stored at 50° C. for one month and the viscosity of the composition before storage were measured at a temperature of 23° C. by a Brook-field viscometer made by Tokyo Keiki Kabushiki Kaisha (roter; No. 7, screw speed: 2 rpm).

Also, a tack free time at 20°±3° C. of the cured product of the composition was measured according to Japanese Industrial Standard (JIS) A 5758.

Further according to JIS A 5758,the type 2 H-shaped specimen was prepared from the obtained composition (adherent: anodic oxidized aluminum, primer: silicon compound commercially available under the trade name "APZ-730" made by Nippon Unica Kabushiki Kaisha). After aging the specimen under the predetermined test conditions, its tensile property (elongalion at bread) was measured.

The results are shown in Table 1.

COMPARATIVE EXAMPLES 1 TO 3

The procedure of Example 1 to 3 was repeated except that the vinyl chloride polymer (B) (PSM-30) was not used and a calcium carbonate was used in the amount shown in Table 1 as the filler.

The results are shown in Table 1.

TABLE 1

| Example No. | Ex. 1 | Ex. 2 | Ex. 3 | Com. Ex. 1 | Com. Ex. 2 | Com. Ex. 3 |
|---|---|---|---|---|---|---|
| Component (part) Organic Polymer (A) | 100 | 100 | 100 | 100 | 100 | 100 |
| Filler: | | | | | | |
| Vinyl chloride polymer (B) (PSM-30) | 100 | 130 | 150 | — | — | — |
| Calcium carbonate | 30 | — | 150 | 130 | 130 | 300 |
| Pre-drying of the fillers (*1) | not done | not done | done | not done | done | done |
| Dioctyl phatalate | 60 | 60 | 100 | 60 | 60 | 100 |
| Titanium dioxide | 10 | 10 | 10 | 10 | 10 | 10 |
| Hydrogenated castor oil | 4 | 4 | 4 | 4 | 4 | 4 |
| Nocrac NS-6 | 0.5 | 0.5 | 0.5 | 0.5 | 0.5 | 0.5 |
| Xylene | 10 | 10 | 10 | 0 | 0 | 0 |
| A 1120 | 3.0 | 3.0 | 3.0 | 3.0 | 3.0 | 3.0 |
| No. 918 | 3.0 | 3.0 | 3.0 | 3.0 | 3.0 | 3.0 |
| Property | | | | | | |
| Viscosity (poise) | | | | | | |
| before storage | 9,300 | 7,800 | 10,200 | 11,800 | 11,800 | 13,800 |
| after one-month | 9,400 | 7,880 | 10,310 | gellation | 14,700 | 24,300 |
| Tack free time (Hours) before storage | 2.2 | 2.0 | 2.0 | 6.0 | 6.0 | 5.0 |
| Elongation at break (%) | 490 | 480 | 430 | 410 | 420 | 310 |

(Note)
(*1) The fillers were previously dried at a temperature of 120° C. for 5 hours under a reduced pressure of 10 mm Hg.

From the results in Table 1, it will be understood that when vinyl chloride polymer (B) is employed as the filler, the viscosity of the curable composition is hardly increased after one-month storage at 50° C. even if the fillers were not previously dried (Examples 1 and 2). Also, it will be understood that when the vinyl chloride polymer (B) is used, even if the curable composition contains a large amount of other fillers, the viscosity after one-month storage at 50° C. of the composition is hardly increased (Example 3).

On the other hand, it will be understood that when only calcium carbonate is employed as the filler and the filler is not previously dried, the gelation of the composition is caused after one-month storage at 50° C. and the composition cannot be used as a sealant (Comparative Example 1). Also, it will be understood that even if the filler is previously dried, when the composition contains a large amount of the filler, the viscosity is increased after one-month storage at 50° C. and the workability of the composition is lowered (Comparative Example 3).

Further it will be understood that when only calcium carbonate is employed as the filler, the tack free time of the cured composition becomes longer.

In addition to the ingredients used in the Examples, other ingredients can be used as set forth in the specification to obtain substantially the same results.

What we claim is:
1. A curable composition comprising,
(A) an organic polymer having in its molecule at least one cross-linkable group containing a silicon atom to which a hydrolyzable group is bonded, said cross-linkable group being cross-linkable to produce an elastomer by the formation of a siloxane bond,

(B) 50 to 300 parts by weight of particles of a vinyl chloride paste resin per 100 parts by weight of said organic polymer (A), said vinyl chloride paste resin particles being present in said composition as a filler, and (C) a plasticizer for vinyl chloride paste resin; said vinyl chloride paste resin being partially gelatinized with said plasticizer.

2. The composition of claim 1, wherein said organic polymer (A) has a number average molecular weight in the range of 300 to 1,000,000.

3. The composition of claim 1, wherein said organic polymer (A) is an alkylene oxide polymer having a main chain which consists essentially of repeating units represented by the formula (3):

$$-R^1-O- \qquad (3)$$

wherein $R^1$ is a bivalent hydrocarbon group having 1 to 8 carbon atoms.

4. The composition of claim 1, wherein said crosslinkable group is bonded at its terminal to said organic polymer (A).

5. The composition of claim 1, wherein said vinyl chloride paste resin is a vinyl chloride paste resin having an average degree of polymerization of 200 to 10,000.

* * * * *